T. R. Williams.
Felting Machine.
No 199
5992X RELATED DOC
Reissued May 6, 1851.
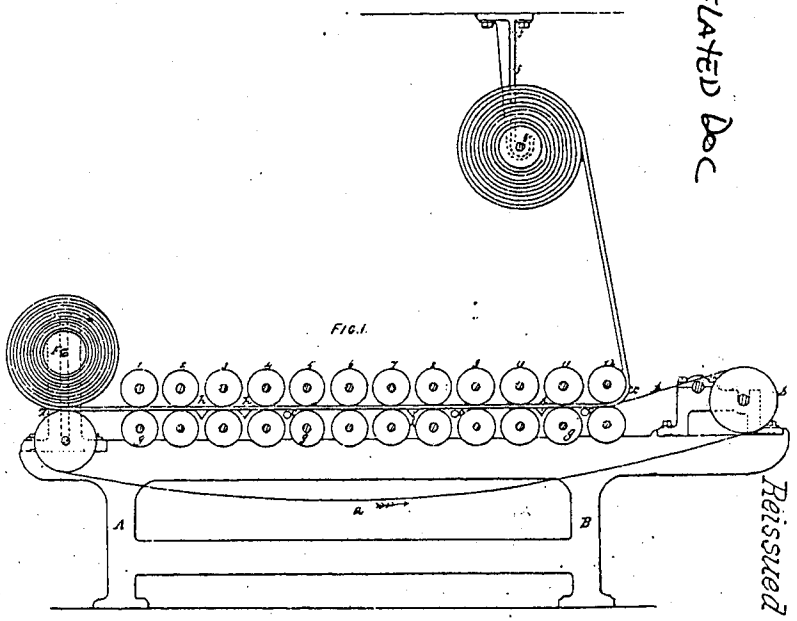
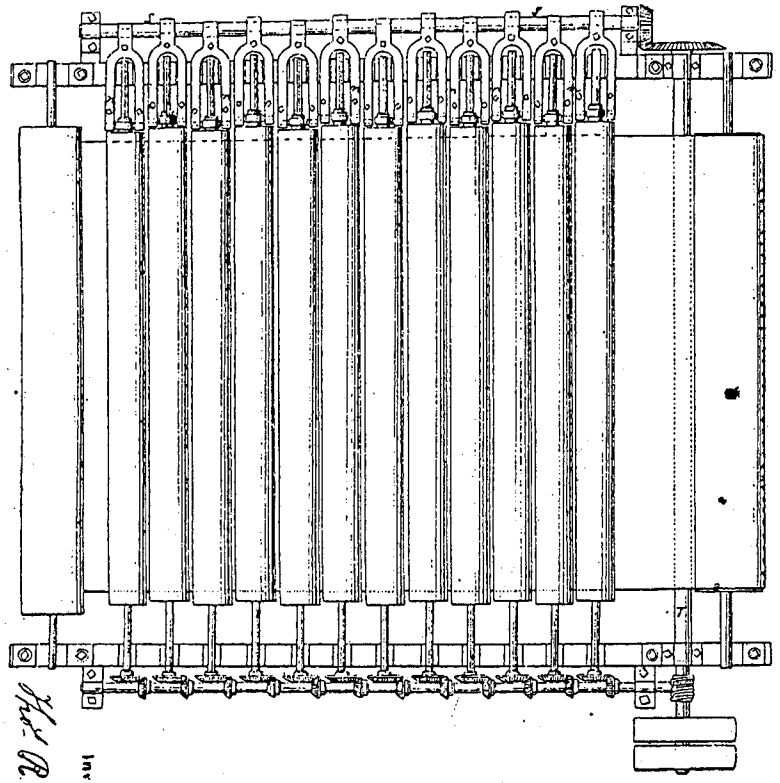
Witnesses.
Inventor
Thos. R. Williams

UNITED STATES PATENT OFFICE.

J. BURROWS HYDE, OF NEW YORK, N. Y., ASSIGNEE OF T. R. WILLIAMS.

IMPROVEMENT IN MACHINERY FOR HARDENING BATS IN FELTING.

5992x Related DOC

Specification forming part of Letters Patent dated December 14, 1840; Reissue No. 199, dated May 6, 1851.

*To all whom it may concern:*

Be it known that THOMAS ROBINSON WILLIAMS, a citizen of the United States, did invent a certain new and useful improvement in machinery for forming bats in the manufacture of felt, being part of the improvements described in the specification of letters granted for improvements in the machinery and process for the manufacture of felt to the said THOMAS ROBINSON WILLIAMS, bearing date the 14th day of December, 1840; and I do hereby declare that the following is a full, clear, and exact description thereof, reference being had to the accompanying drawings, making part of this specification, in which—

Figure 1 is a longitudinal vertical section of one of the machines which may be used for the purpose of hardening the bat, and Fig. 2 a plan thereof.

The same letters indicate like parts in both the figures.

The said invention consists in forming bats or slivers into cloth by the machinery and process hereinafter described, the cloth so formed depending for its strength and the union of the materials composing it upon the tendency of the materials to felt together, and this is done without the usual auxiliaries of spinning or weaving, or of oil or oleaginous matter, which is generally required in the ordinary manufacture for assisting the spinning of yarns; but the wool should be merely well washed, picked, and dried, after which it should be teased and scribbled in the usual way. The dry, clean material, as it is thus prepared, is then to be weighed out into quantities for producing any required thickness and width of goods.

This invention relates to the process for hardening the bat or sliver formed as before described, or otherwise; and it consists in the use of a machine for this purpose, which is composed of two series or tiers of rollers, (covered with cloth or otherwise,) between which the bat or sliver is passed, the said rollers being provided with a reciprocating endwise motion for the purpose of felting the bat, and a progressive rotary motion for the purpose of feeding the bat through. The roller E, with the bat upon it, is then placed in the situation marked *f f*. A B is the frame-work of the machine, and 1, 2, 3, 4, 5, 6, 7, 8, 9, 10, 11, and 12 are rollers, of which there are two sets, placed, in this instance, (although not necessarily,) directly over each other. These rollers are wrapped around with an elastic cloth, and the lower tier, *g*, are furnished with an apron as represented at *a a*. There are several small pipes connected with a steam-boiler brought up and inserted between the lower rollers and under the aprons, as represented at *c c c*, extended from side to side of the apron and finely perforated upon their upper sides, for the purpose of admitting steam to escape upward for moistening and warming the bat of wool where the felting process called "hardening" is now commenced. The upper tier of hardening-rollers receives an alternating motion endwise by a crank or shaft, *s*, running along its side, upon which there are as many cranks or eccentrics, having a short throw of about three-eighths of an inch, and connected with each upper roller by shackle-bars or slide-rods *n n*. The hardening-rollers receive also a slow progressive motion from the main shaft on the other side of the machine by suitable gearing, consequently moving the apron between them as well in the direction of the arrow. There are likewise inserted between these rollers and under the apron several heaters, *h h h h*. These heaters are of hollow metal and connected by stop-cocks with the steam-pipes, for the purpose of increasing and regulating the heat applied to the bat and assisting the incipient felt. The bat being placed in the position *f f*, Fig. 1, and its end being entered between the front rollers of the hardening-machine at *x*, it is gradually passed through them, which, with the alternating motion of the upper rollers acting against the resistance offered by the lower ones, (which do not alternate,) aided by the moisture and heat, arrives at the other end of the machine in a consolidated, firm state. Here, at *z*, it is again wound upon a roller, F, by friction of contact with the apron *a*, and when an old bat intended for an end of cloth is finished and wound upon it it is taken away to receive the next operation by repeating the same or placing in the fulling-stocks. Hot water or soap-suds heated by steam may be thrown onto the bat after passing roller 12, for the purpose of increasing the felting process.

In order to produce the finest and best felt, it is very desirable to allow the felting-rollers to act upon the material in every possible direction. By the reciprocating motion of this machine we have seen that this is produced in each direction longitudinally. In this way it may now be run through this machine several times, and for some descriptions may even be for a time milled in the common clothiers' stocks; but it is desirable to avoid this, and at all events the goods should be finished, if possible, in this machine, the stocks being apt to produce an unequal or an uneven surface, called a "grain."

What is claimed as the invention of the said THOMAS ROBINSON WILLIAMS is—

The method, substantially as described, of hardening the bat by passing the same between two series or tiers of rollers covered with cloth, or otherwise, and arranged over each other, the one series being provided with a reciprocating endwise motion for the purpose of felting the bat, and the other series with a progressive rotary motion for the purpose of feeding the bat through, with or without the use of a trough containing hot water and soap-suds or other matter, substantially as described.

Witnesses: J. BURROWS HYDE.
ALEX. PORTER BROWNE,
CAUSTEN BROWNE.